(12) United States Patent
Murphy

(10) Patent No.: US 6,181,791 B1
(45) Date of Patent: Jan. 30, 2001

(54) APPARATUS AND METHOD FOR REDUCING LOCAL INTERFERENCE IN SUBSCRIBER LOOP COMMUNICATION SYSTEM

(75) Inventor: Joseph A. Murphy, Ontario (CA)

(73) Assignee: STMicroelectronics, Inc., Carrollton, TX (US)

( * ) Notice: Under 35 U.S.C. 154(b), the term of this patent shall be extended for 0 days.

(21) Appl. No.: 09/003,380

(22) Filed: Jan. 6, 1998

(51) Int. Cl.[7] .................................................. H04B 3/20
(52) U.S. Cl. ..................... 379/390; 379/410; 379/406; 455/63
(58) Field of Search ................... 379/406, 410, 379/411, 390; 455/63

(56) References Cited

U.S. PATENT DOCUMENTS

| | | | |
|---|---|---|---|
| 4,707,824 | * 11/1987 | Kanemasa | 370/290 |
| 5,162,762 | * 11/1992 | Flanagan | 331/15 |
| 5,247,512 | * 9/1993 | Sugaya et al. | 370/289 |
| 5,414,766 | * 5/1995 | Cannalire et al. | 379/410 |
| 5,461,616 | 10/1995 | Suzuki . | |
| 5,596,604 | 1/1997 | Cioffi et al. . | |
| 5,623,513 | 4/1997 | Chow et al. . | |
| 5,625,646 | * 4/1997 | Goodson et al. | 375/285 |
| 5,627,501 | 5/1997 | Biran et al. . | |
| 5,646,991 | * 7/1997 | Sih | 379/410 |
| 5,687,229 | * 11/1997 | Sih | 379/410 |
| 5,774,561 | * 6/1998 | Nakagawa et al. | 381/66 |
| 5,912,966 | * 6/1999 | Ho | 379/410 |

* cited by examiner

Primary Examiner—David R. Hudspeth
Assistant Examiner—Daniel Abebe
(74) Attorney, Agent, or Firm—Theodore E. Galanthay; Lisa K. Jorgenson; Christopher F. Regan

(57) ABSTRACT

An apparatus communicates over a communications channel and has reduced undesired local echo. The transmitter generates a transmit signal to the communications channel in a frequency band outside a voice frequency band. A receiver receives signals from the communications channel within or outside the voice frequency band, and is susceptible to undesired local echo from the transmit signal. In one method, a programmable scaler is connected to the transmitter and generates a scaled replica of the transmit signal based upon a scaled control signal. The receiver is connected to the scaler and reduces the undesired local echo by subtraction of a scaled replica of the transmit signal. An echo reducing circuit senses the received signal power and generates the scaled control signal based upon the received signal power to thereby reduce the undesired local echo In a second method, an estimate of the transfer function from the transmitter digital-to-analog converter to the input of a cancellor is developed. This is used to replicate the local echo path so that the canceling signal can be generated that is identical or very similar to the unwanted local echo in terms of both amplitude and phase and so is used to cancel it. The advantages are to reduce the complexity of the analog filtering and reduce the dynamic range requirements of the analog-to-digital converter thereby making it more easily integrated on one silicon chip.

34 Claims, 3 Drawing Sheets

APPARATUS AND METHOD FOR REDUCING LOCAL INTERFERENCE IN SUBSCRIBER LOOP COMMUNICATION SYSTEM

FIELD OF THE INVENTION

The invention relates to communication systems, and more particularly, to an apparatus and method for reducing interference in a communication system.

BACKGROUND OF THE INVENTION

Communication to residences and commercial structures typically use a twisted pair of copper wires for telephone voice band transmission in a frequency range of 300 to 3,400 Hz. When a personal computer or similar digital communication device having a modem is in use, the telephone line cannot be used for a normal telephone conversation because the modem uses the bandwidth assigned to the voice band transmission.

However, a twisted pair telephone line may have a bandwidth of several MHZ. Unfortunately in the past, the voice band frequency was the only bandwidth used with these lines because the equipment at the telephone company would only pass the voice band. Now, modern telephone equipment can support higher transmission rates. Still, because of the characteristics of the entire channel, end user telephone and data communication equipment typically use the same voice band.

At higher frequencies, especially in the MHZ frequency range, the signals are greatly attenuated especially when transmitted over distances up to several thousand meters. To overcome this, it is necessary that any transmitter, such as a modem and its associated circuitry, transmits the signal at a much higher power than is usual to account for the signal attenuation. By using a frequency range above a voice frequency band for some transmission, such as data transmission, it is possible to simultaneously use the telephone for normal voice communication.

For example, for a typical Internet user, only a few command signals are generated and transmitted to the Internet Service Provider on the uplink. At the same time, however, signals having a wide bandwidth may be received. In other words, the lower bandwidth requirement on the uplink and higher bandwidth requirement on the downlink defines an asymmetric communication system. Because the frequencies above voice band are subject to greater attenuation, transmitter power may be increased during or prior to transmission. Unfortunately, the increased transmitter power does create some difficulties, such as local echo which may interfere with the received signals. This unwanted echo may be generated by various means, such as any impedance mismatch between the transmitter and the twisted pair telephone line or other equipment connected to the line. These problems occur in duplex transmission when one wants to transmit and receive at the same time.

One prior art approach to address the unwanted echo signal has provided relatively complicated analog filters in the circuitry of the modem. Typically, these filters may include a voice band and high frequency filters, as well as various receiver and transmitter filters. These systems require high order analog filtering to remove the effects of the transmitted signal from the receive band.

Also, a receiver's analog-to-digital converter may need a very large dynamic range so that the composite received signal (the received signal including the echo) does not saturate the analog-to-digital converter. It is also important to sample the desired signal with enough resolution to meet the required signal-to-noise ratio. This requirement is difficult to achieve in practice.

Another prior art approach has been to generate a scaled replica of the transmitted signal, and subtract the replica from the received signal to thereby remove or reduce the unwanted echo. In such a prior art device, a voltage scaler is operatively connected to the transmitter to generate the scaled replica of the transmit signal which, in turn, is fed to an inverting input of an amplifier to cancel the unwanted echo based on the transmitted signal. Typically, this type of device and method are limited because it was assumed that half of the power was transmitted to the telephone line, while half the power was reflected back into the receiver as unwanted interference in the entire frequency band. This system also anticipated a fixed line impedance (e.g., 110 Ohms) to obtain cancellation of the unwanted echo signal before it reached the analog-to-digital converter of the receiver.

As the line impedances can typically vary by ±20%, thus, the local echo may have a different amplitude than that produced by the scaler configured for a fixed line impedance. Additionally, the replicated echo cancellation signal may be ineffective due to amplitude and phase differences between the unwanted transmitter signal forming the echo and the replicated signal. This is because the scaler only tries to match the resistive component and ignores the inductive and capacitive components of the line impedance. To overcome this in the past has meant designing complex analog filters and high-dynamic range A/D's as mentioned previously.

SUMMARY OF THE INVENTION

In view of the foregoing background, it is therefore an object of the present invention to provide an apparatus and method for reducing local echo in a communication system, particularly of a duplex communication system operating over a twisted pair telephone line.

In one aspect of the present invention, the apparatus comprises a transmitter for generating a transmit signal to the communications channel in a frequency band outside a voice frequency band. A scaler is connected to the transmitter and generates a scaled replica of the transmit signal based upon a scale control signal. A receiver receives signals from the communications channel either within or outside the voice frequency band and is susceptible to undesired local echo from the transmit signal. The receiver is connected to the scaler and reduces the undesired local echo by subtraction of the scaled replica of the transmit signal. An echo reducing means senses the received signal power and generates the scaled control signal based upon the received signal power thereby reducing the undesired local echo.

The echo reducing means preferably comprises a test means for testing the communications channel by inputting a predetermined test signal to the transmitter when or before the received signal power is being sent from the far end. The echo reducing means further comprises power minimizing means for setting the scaled control signal responsive to the minimum received signal power during testing of the communications channel.

In another aspect of the present invention, the receiver comprises an amplifier having one input connected to the communications channel, and a second input connected to the scaler. The amplifier acts as a subtractor because it subtracts or cancels the unwanted transmit signal with a scaled replica of it. An analog-to-digital converter (ADC) is connected to an output of the amplifier. The echo reducing means comprises an encoder connected between an output of the ADC and a scaler. The scaler comprises voltage scaling means for generating a scaled voltage replica signal.

In still another aspect of the present invention, the scaler comprises a resistor ladder for setting the scaled control signal. The resistor ladder comprises a plurality of tuning resistors, and a respective switch connected thereto. The switches are connected to and responsive to the encoder.

In still another aspect of the present invention, the apparatus comprises a transmitter for generating a transmit signal to the communications channel in a frequency band outside a voice frequency band. Echo reducing means generates a scaled replica of the transmit signal, which is phase and amplitude adjusted therewith. The echo reducing means also comprises channel characterization means for characterizing the communications channel. The receiver receives signals from the communications channel either outside or in the voice frequency band and is susceptible to undesired local echo from the transmit signal. The receiver is connected to the echo reducing means and reduces the undesired local echo by subtraction of the amplitude and phased adjusted replica of the transmit signal.

In still another aspect of the present invention, the echo reducing means comprises a processor for creating a model of the undesired local echo. This model consists of a digital filter, possibly implemented in a DSP, so that the transfer function of the cancellor path (i.e., H(z), D/A, filtering and gain blocks) exactly or approximately matches the normal transmitted local echo path in terms of both amplitude and phase. The channel characterization means further comprises means for generating a test signal. The echo cancellation means further comprises memory means for storing a plurality of models relating to the respective different characterizations of the communications channel. The memory means can comprise a ROM or RAM or non-volatile RAM.

In still another aspect of the present invention, the apparatus comprises an antialiasing filter. The receiver comprises an amplifier that acts as a subtractor, and has one input connected to the communications channel and a second input connected to the echo reducing means. The echo reducing means further comprises a digital-to-analog converter (DAC) connected to the second input of the amplifier. An analog-to-digital converter (ADC) can be connected to the output of the amplifier. A low pass filter can be connected between the amplifier and the ADC.

A method aspect of the invention allows communication over a communications channel with reduced undesired local echo. The method comprises the steps of generating the transmit signal to the communications channel in a frequency band outside the voice frequency band. The method further comprises generating a scaled replica of the transmit signal based upon a scaled control signal. The method further comprises reducing the undesired local echo by subtracting the scaled replica of the transmit signal from the received signals The method further comprises sensing received signal power and generating the scaled control signal based upon the received signal power to thereby reduce the undesired local echo.

The method further comprises the step of reducing echo by testing the communications channel by inputting a predetermined test signal for transmission when the unwanted received signal power is being sensed. The method further comprises the step of reducing echo by setting the scaled control signal responsive to sensing a minimum received signal power during testing of the communications channel.

In still another method aspect of the invention, the method comprises the steps of generating a transmit signal to the communications channel in a frequency band above a voice frequency band. The method comprises generating a scaled replica of the transmit signal, phase synchronized therewith, and characterizing the communications channel. The method further comprises receiving signals from the communications channel within or outside the voice frequency band and being susceptible to undesired local echo from the transmit signal, and while reducing the undesired local echo by subtraction of the scaled and phase synchronized replica of the transmit signal.

BRIEF DESCRIPTION OF THE DRAWINGS

Other objects, features and advantages of the present invention will become apparent from the detailed description of the invention as follows, when considered in light of the accompanying drawings in which.

DETAILED DESCRIPTION OF THE CURRENT EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention permits the reduction of local echo in a communication system, particularly an asymmetric digital subscriber loop communication system. Asymmetric digital subscriber loop communication systems are becoming increasingly more popular. An example of such a system is disclosed in U.S. Pat. No. 5,461,616 to Suzuki, disclosing an interactive television system, such as video-on-demand, network game, and home shopping systems using a switching network. In this patent, the system uses an existing telephone line to form a two-way transmission of the audio signal at 3.4 kHz as in the case of a normal telephone system. Images are transmitted at 1.5 Mbps from an exchange to a subscriber. A control signal is transmitted which requests the desired image signal at 16 kbps from the subscriber to the exchange. This subscriber line is referred to as an asymmetric digital subscriber line.

In some asymmetric digital subscriber loop communications (ADSL) and very high frequency digital subscriber loop communication systems (VDSL), it is known that a reflected portion of the transmitted signal typically returns back from the communications channel in the receive band as an unwanted interference signal forming the local echo.

This return signal could be at a higher power level than the received signal because the originally transmitted signal was transmitted at a much higher power to account for signal attenuation based on the higher frequencies above the voice band. In many prior art systems, the receiver's analog-to-digital converter typically had to have a very large dynamic range to account for the attenuation so that the composite received signal (the unwanted transmit signal forming the echo and the desired receive signal) did not saturate the analog-to-digital converter. At the same time, it was necessary to sample the desired signal with enough resolution to meet the required signal-to-noise ratio. In still other prior art systems, the use of high order analog filtering was required in order to remove the transmitter signal power from the receive band. This was a challenging design for engineers because of the high order filters required to adequately suppress the unwanted transmit signal.

Figure 1:
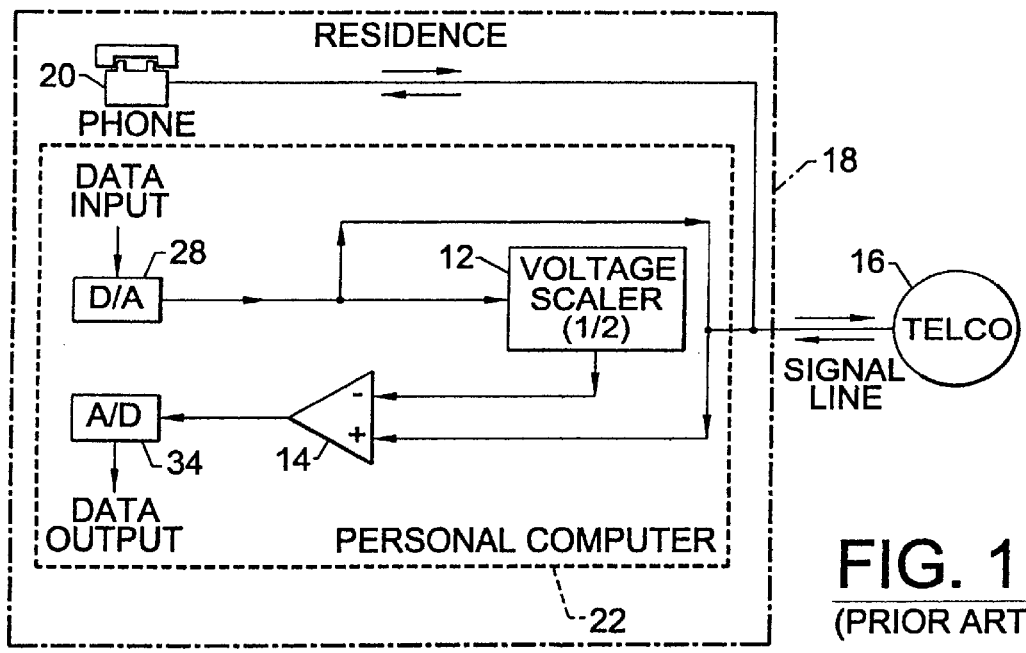
FIG. 1 is a schematic block diagram of a prior art communication apparatus using a voltage scaler to reduce echo.

FIG. 1 illustrates a prior art improvement over these methods outlined above by an apparatus which uses a voltage scaler 12 for producing a scaled replica of the transmit signal. This scaled replica is input into an operational amplifier 14, together with the received signal from the communications channel connected to a switch of a telephone company (Telco) 16. As shown in FIG. 1, a residence is defined by dotted line 18, and includes a telephone 20 and personal computer (indicated by dotted lines at 22) having a modem. The telephone 20 operates on a standard 300 to 3,300 hertz bandwidth, while the computer 22 includes the modem for generating and transmitting a transmit signal over a communications channel in a frequency range above the voice frequency band. This frequency can be over a broad spectrum. The higher frequency communications channel would be appropriate for Internet access. A low bandwidth could be used for transmitting signals, such as a keystroke command, while a high bandwidth could be used for downloading pictures, graphics and other data from an Internet provider.

As shown in FIG. 1, data is input into a digital-to-analog converter 28, which receives the data input from the personal computer 22, and generates a transmit signal into the communications channel. Any data modulation in this modern modem is most likely to occur before digital-to-analog conversion. This transmit signal typically has a greater power than a signal received from the Telco 16 to account for attenuation problems, using the higher frequencies above the voice frequency band. Generally the power of the transmit signal can vary as known to those skilled in the art. This greater power produces a local echo, such as when the signal traverses from the two wires in a residential circuit to the common four wires, causing an impedance change. Thus, the received signal includes an unwanted local echo.

As shown in FIG. 1 prior art, the voltage scaler 12 receives part of the transmit signal and inputs it into one input of the amplifier 14, together with the signals received from the communications channel within or outside the voice frequency band, which includes the unwanted transmit composite signal forming the local echo. The output of the amplifier 14 is the received signal from the signal line with some cancelled echo. The receiver includes an analog-to-digital converter 34, generating the desired output. Data demodulation will most likely occur after analog-to-digital conversion. This system, however, has a drawback because line impedance can vary by ±20%. In the structure of FIG. 1, various assumptions can be made, such as a line impedance (Zo) that equals 110 Ω±20%.

It can be assumed that half the power is actually transmitted up the line, while half the power comes back into the receiver as an unwanted interferer. If a simple amplifier circuit is used as shown in FIG. and the line impedance is exactly 110 Ω, then one would obtain cancellation of the transmit signal before that signal reaches the receiver analog-to-digital converter 34.

Appropriate valued resistors could be used to ensure that the transmit signal is scaled correctly to ensure that the scaled signal cancels the transmit signal. However, in most communication systems, the line impedance can vary by ±20%, such as modeled in FIG. 2. Assuming Zo=80% of 110 Ω, then:

$$Vr = \frac{0.8 - 110}{0.8 - 110 + 110} = 0.444 \, Vt$$

Ideally, Vr should equal 0.5 Vt. This is assuming an 80% mismatch with the assumption that there is no perfect line impedance matching. Assuming there is an 80% mismatch, it is still possible to obtain a reduction of transmitted power of 18 db.

The uncancelled signal=(0.5−0.444) Vt=0.0555 Vt. Converting this into power, the following power cancellation is obtained:

Pr=20*log (0.0555/0.444) dB=−18 dB

In this "idealized" case, it is possible to obtain a 18 dB improvement in dynamic range requirements if this prior art method is used. However, in this prior art, no accommodation for phase delay of any of the frequency components of the transmit signal is made. This means that in practice, the "ideal" case will never be realized, especially at higher frequencies where the phase response of the echo path becomes more important.

Figure 2:
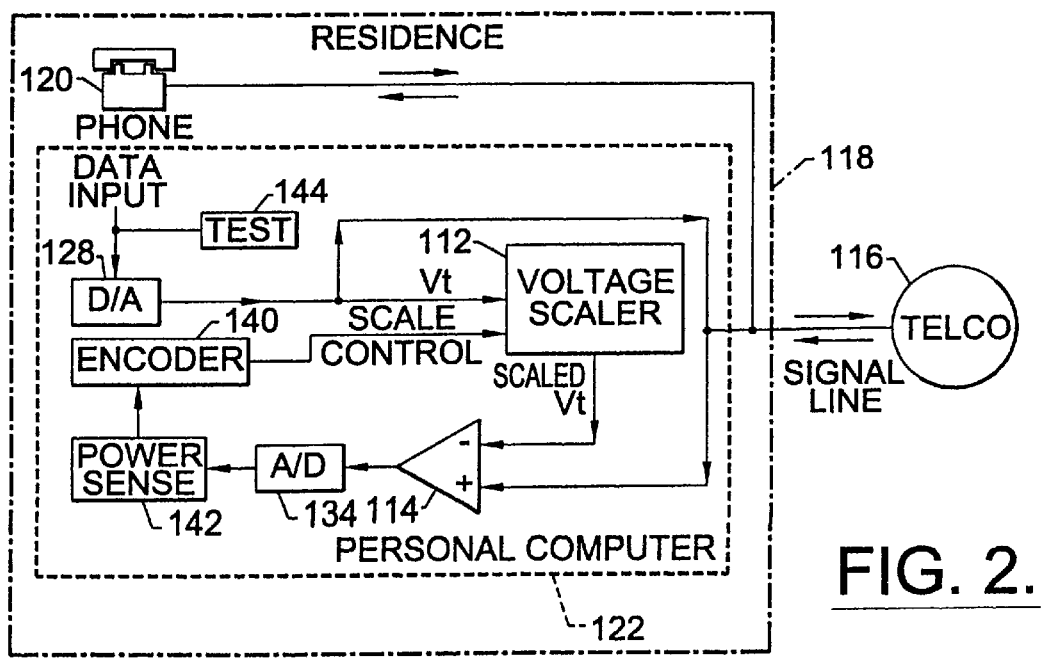
FIG. 2 is a schematic block circuit diagram of an apparatus of the present invention for reducing local echo.
Figure 4:
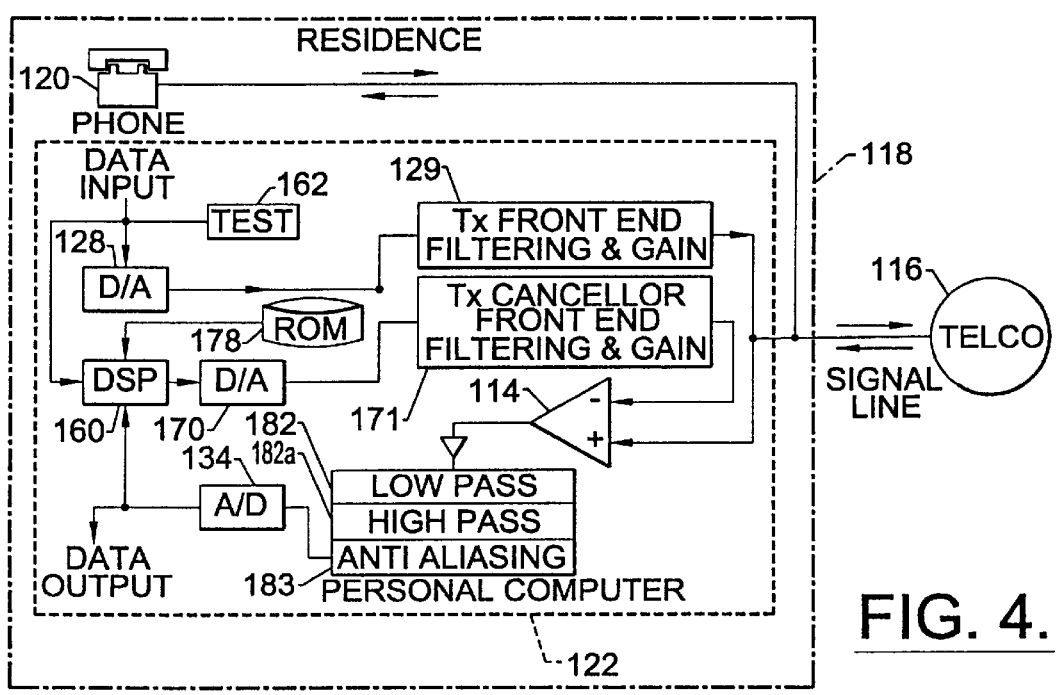
FIG. 4 is a schematic block circuit diagram of another embodiment of the apparatus of the present invention where a transfer function of the cancellor path is generated to match the normal transmitted local echo path in terms of both amplitude and phase.

In accordance with the present invention as shown in FIG. 2, the power cancellation of the unwanted transmit signal forming the local echo can be improved when the voltage scaler provides the exact amplitude replica of the transmit signal forming the local echo. In the embodiments of FIGS. 2 and 4, any common elements similar to the embodiment of FIG. 1 retain similar reference numerals beginning in the 100 series. In the embodiment of FIG. 2, the voltage scaler 112 is responsive to a scale control signal as generated by echo reducing means in the form of an encoder 140, which generates the scale control signal to the voltage scaler 112 based upon the received signal power from the analog-to-digital converter 134, thereby reducing echo. The apparatus is part of a personal computer 122, communicating via modem with Telco 116. However, the apparatus, in accordance with the present invention, does not have to be part of a personal computer. The residence 118 includes a phone 120 as standard. Power sensing means 142 includes circuitry for measuring the received power of the signal and in conjunction with the encoder sets the scale control signal responsive to sensing a minimum received signal power during testing of the communications channel.

Test means 144 in the form of a testing circuit is operable for characterizing the line impedance and is operable by inputting a predetermined test signal to the transmitter when or before the received signal power is being sensed. It is desirable to "test" the line by sending test signals and listening for them in the receiver band, and then optimizing the cancellation before "real" received data is received. Several test signals may be required before optimal cancellation can be achieved. The voltage scaler 112 determines the amplitude of the transmit signal that is fed through the cancelling operational amplifier 114, which is a summing amplifier.

During a testing period, the major signal components coming in as the receive signal from the communications channel in the receive band would be the unwanted signal forming the local echo. During a start-up operation of the apparatus shown in FIG. 2, the voltage scaler 112 could be established assuming that the line impedance was about 110 ohms. The power sensing means 142 would measure the power of the signal from the ADC 134 and with the encoder 140, adjust the voltage scaler 112 accordingly so that the local echo could be reduced by subtraction of the scaled replica of the transmit signal Further adjustments could be made until the optimum voltage scaling was achieved. The voltage scaling could be achieved by several different methods, including one scheme having a resistor ladder 150, as shown in FIG. 3, with a tap point at the central portion of the resistor ladder 150 for setting the scale control signal.

Figure 3:
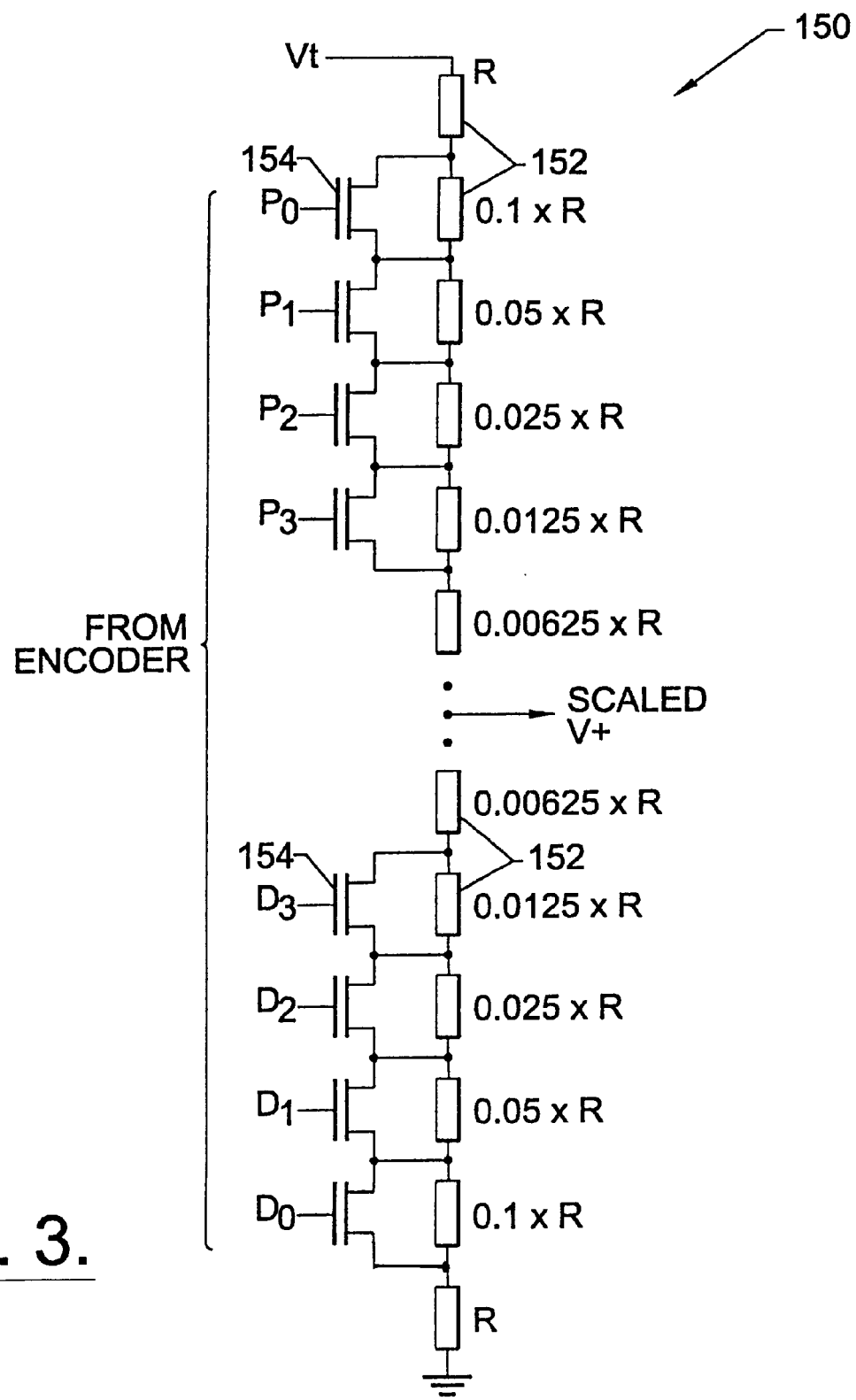
FIG. 3 is a more detailed schematic block circuit diagram of a portion of the apparatus as shown in FIG. 2.

As shown in FIG. 3, the resistor ladder 150 comprises a plurality of tuning resistors 152 with respective switches 154 in the form of transistors, labeled in the P and D series. Thus, it is evident that the resistor value is adaptably adjusted so that the voltage is scaled to the amplitude. The unwanted transmit signal at the top is called Vt and comes into the resistor ladder 150, where it is emitted as "scaled Vt." The scaled Vt will be a certain ratio of the original Vt depending on how many of the transistor switches are open or closed.

It is evident that the scaled Vt used to cancel the unwanted Vt signal can be made as accurate as required by making the resistor ladder "deeper." The Vt as scaled can be defined by the following equation:

$$V_{1,unrel} = \frac{R + 0.1R \sum_{n=0}^{N} 2^{-n} \cdot D_n}{2R + 0.1R \left( \sum_{n=0}^{N} 2^{-n} \cdot P_n + \sum_{d=0}^{N} 2^d \cdot D_d \right)}$$

It can be shown that the maximum error is one half the resolution of the voltage steps. For N=4, this will be approximately 0.01 Vt. So assuming actual unwanted TX is equal to 0.5 Vt, then the power cancellation will be as follows:

Pr=20*log (0.001/0.5) dB=−54 dB

FIGS. 2 and 3 have illustrated the apparatus and the method in accordance with one aspect of the present invention, where the unwanted local echo ia subtracted by the use of a scaled replica of the local echo from the received signal. It should be noted that the apparatus would not have an effect on phase delays and frequency distortions on the transmitted signal.

FIG. 4 illustrates a schematic block diagram of the apparatus in another aspect of the present invention, where the subtracted signal has similar characteristics as the unwanted receive signal in terms of both phase and amplitude. As in FIG. 2, the phone 120 is included within the residence 118, as is the personal computer 122. The echo reducing means generates a scaled replica of the transmit signal phase synchronized with the transmit signal. Additionally, channel characterization means 162 characterizes the communications channel by generating a test signal to the transmitter and its digital-to-analog converter (DAC). As illustrated, a digital signal processor 160 receives the test signals and data input generated such as from the home computer 122, as well as the data output from the analog-to-digital converter 134. The digital signal processor 160 processes the data output and the test signal, and creates a digital model of the local echo such as generated by the test signal, based on the amplitude and frequency, which are then converted by a digital-to-analog converter 170 to an analog signal and input into the amplifier 114 to act as a cancellation signal. Typically, data modulation will occur before digital-to-analog conversion. Additionally, as illustrated, the signal can pass through transmitter cancellor front end filtering 171.

The digital signal processor and associated processing circuitry could use standard algorithms or other associated methodology known to those skilled in the art, and creates a digital model for the transfer function of the local echo path H(Z). This model can be created before the digital conversation is begun with the transmission of signals.

The channel characterization means 162 characterizes the line impedance by sending test signals to measure how effectively the cancellation is working. The optimum H(Z) would be that which causes the transfer function of the cancellor path (i.e., H(z), D/A 170, filter and gain block 171 to the input of the amplifier 114) to match the transfer function of the local echo path (i.e., from the transmitter digital-to-analog converter 128 through a front end filtering and gain circuit 129 to the input of the amplifier 114). The model of the path from the transmitter digital-to-analog converter to the input of the operational amplifier can be developed so that the computational overhead for the various coefficients can be calculated only once before the actual transmission of data. The plurality of different digital models relating to respective echoes characterized by different line impedances can also be stored. The storage can be in ROM 178 or in RAM or in non-volatile RAM.

A low-pass filter 182 and high pass filter 182a could also be included as illustrated to further filter any cancelled signal before it reaches the analog-to-digital converter 134. This could be beneficial because the noise bandwidth of the signal would otherwise be large and cause convergence problems in the practical implementation of the H(Z). The specification of this filter could be merged with an antialias filter 183 in order to reduce the cost of implementing the whole structure. It is also possible that updating can occur during transmission using a parameter such as a bit error rate as a flag for recharacterization of the line. Also, the digital-to-analog converter 170 in the cancellor path can be clocked at a different rate and have a different resolution (i.e., the number of quantization levels) than the transmit digital-to-analog converter 128, as it could improve the transfer function matching.

One major advantage of the present invention is that the components as described can be fabricated on one semiconductor substrate, thus reducing costs. Without this invention, the design would require complex analog filtering and an analog-to-digital converter with very high dynamic range. Both of these are difficult to design, especially on one integrated chip. This invention simplifies the requirements of both the analog filtering and the analog-to-digital converter so that it can be more easily implemented on a single integrated chip and so making the entire solution smaller and dissipate less power and be more cost effective. Another advantage could be to allow recharacterization to compensate for component and other variations in this system due to temperature, aging, manufacturing tolerances or changes in line impedance.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed and that the modifications and embodiments are intended to be included within the scope of the dependent claims.

That which is claimed is:

1. An apparatus for communicating over a communications channel and having reduced undesired local echo, the apparatus comprising:
   a transmitter for generating a transmit signal to the communications channel in a frequency band outside a voice frequency band;
   a programmable scaler connected to said transmitter for generating a scaled replica of the transmit signal based upon a scale control signal;
   a receiver for receiving signals from the communications channel within or outside the voice frequency band and being susceptible to undesired local echo from the transmit signal, said receiver being connected to the scaler for reducing the undesired local echo by subtraction of the scaled replica of the transmit signal; and
   echo reducing means for sensing received signal power and for generating the scale control signal and comprising an encoder that generates the scale control signal based upon the received signal power and responsive to sensing a minimum received signal power to thereby reduce the undesired local echo.

2. An apparatus according to claim 1 wherein said echo reducing means comprises rest means for testing the communications channel by inputting a predetermined test signal to said transmitter when an undesired signal power is being sensed.

3. An apparatus according to claim 2 wherein said echo reducing means comprises power minimizing means for setting the scale control signal responsive to sensing a minimum received signal power during testing of the communications channel.

4. An apparatus according to claim 1 wherein said receiver comprises:
   an amplifier having one input connected to the communications channel and a second input connected to said scaler; and
   an analog-to-digital converter (ADC) connected to an output of said amplifier.

5. An apparatus according to claim wherein said encoder is connected between an output of said ADC and said scaler.

6. An apparatus according to claim 5 wherein said scaler comprises voltage scaling means for generating a scaled voltage replica signal.

7. An apparatus according to claim 5 wherein said scaler comprises a resistor ladder for setting the scale control signal.

8. An apparatus according to claim 7 wherein said resistor ladder comprises a plurality of tuning resistors, and respective switches connected thereto; and wherein said switches are connected to and responsive to said encoder.

9. An apparatus for communicating over a communications channel and having reduced undesired local echo, the apparatus comprising:
   a transmitter for generating a transmit signal to the communications channel in a frequency band outside a voice frequency band;
   a scaler connected to said transmitter for generating a scaled replica of the transmit signal based upon a scale control signal;
   a receiver for receiving signals from the communications channel within or outside the voice frequency band and being susceptible to undesired local echo from the transmit signal, said receiver being connected to the scaler for reducing the undesired local echo by subtraction of the scaled replica of the transmit signal, said receiver comprising:
      an amplifier having one input connected to the communications channel and a second input connected to said scaler, and
      an analog-to-digital converter (ADC) connected to an output of said amplifier; and
   echo reducing means for sensing received signal power and for generating the scale control signal based upon the received signal power to thereby reduce the undesired local echo, said echo reducing means comprising test means for testing the communications channel by inputting a predetermined test signal to said transmitter when the received signal power is being sensed, said echo reducing means further comprising an encoder connected between an output of said ADC and said scaler.

10. An apparatus according to claim 9 wherein said echo reducing means comprises power minimizing means for setting the scale control signal responsive to sensing a minimum received signal power during testing of the communications channel.

11. An apparatus according to claim 9 wherein said scaler comprises voltage scaling means for generating a scaled voltage replica signal.

12. An apparatus according to claim 9 wherein said scaler comprises a resistor ladder for setting the scale control signal.

13. An apparatus according to claim 12 wherein said resistor ladder comprises a plurality of tuning resistors, and respective switches connected thereto; and wherein said switches are connected to and responsive to said encoder.

14. An apparatus for communicating over a communications channel and having reduced undesired local echo, the apparatus comprising:
   a transmitter for generating a transmit signal to the communications channel in a frequency band outside a voice frequency band;
   echo reducing means for generating a scaled replica of the transmit signal amplitude and phase synchronized therewith, said echo reducing means comprising a digital signal processor for creating a model of undesired local echo, and a memory operatively connected to said digital signal processor for storing a plurality of models relating to respective different characterizations of the communications channel, and channel characterization means operatively connected to the digital signal processor for characterizing the communications channel; and
   a receiver for receiving signals from the communications channel within or outside the voice frequency band and being susceptible to undesired local echo from the transmit signal, said receiver being operatively connected to the digital signal processor for reducing the undesired local echo by subtraction of the scaled and phase synchronized replica of the transmit signal, said receiver further comprising a summing amplifier having one input connected to said communications channel and a second input connected to said digital signal processor.

15. An apparatus according to claim 14 and further comprising an antialiasing filter.

16. An apparatus according to claim 14 wherein said echo reducing means further comprises a digital-to-analog converter (DAC) connected to the second input of said summing amplifier.

17. An apparatus according to claim 16 comprising a second digital-to-analog converter for the transmit signal that could be clocked at a different rate and has a different resolution.

18. An apparatus according to claim 14, further comprising an analog-to-digital converter (ADC) connected to said amplifier.

19. An apparatus according to claim 18 further comprising a low pass filter connected between said amplifier and said ADC.

20. An apparatus according to claim 14 wherein said channel characterization means further comprises means for generating a test signal.

21. An apparatus according to claim 14 wherein said memory means comprises one or a combination of a ROM or RAM or non-volatile RAM.

22. An apparatus for communicating over a communications channel and having reduced undesired local echo, the apparatus comprising:
　a transmitter for generating a transmit signal to the communications channel in a frequency band outside a voice frequency band;
　echo reducing means for generating a scaled replica of the transmit signal amplitude and phase synchronized therewith, said echo reducing means comprising channel characterization means for characterizing the communications channel, said echo reducing means comprising a processor and memory means associated therewith for storing a plurality of models relating to respective different characterizations of the communications channel; and
　a receiver for receiving signals from the communications channel within or outside the voice frequency band and being susceptible to undesired local echo from the transmit signal, said receiver being connected to the echo reducing means for reducing the undesired local echo by subtraction of the scaled and phase synchronized replica of the transmit signal;
　an amplifier having one input connected to the communications channel and a second input connected to said echo reducing means;
　a first digital-to-analog converter (DAC) connected to the second input of said amplifier; and
　a second digital-to-analog converter for the transmit signal that could be clocked at a different rate and have a different resolution.

23. An apparatus according to claim 22 and further comprising an antialiasing filter.

24. An apparatus according to claim 22 further comprising an analog-to-digital converter (ADC) connected to said amplifier.

25. An apparatus according to claim 24 further comprising a low pass filter connected between said amplifier and said ADC.

26. An apparatus according to claim 22 wherein said channel characterization means further comprises means for generating a test signal.

27. An apparatus according to claim 22 wherein said memory means comprises one or a combination of a ROM, or RAM, or non-volatile RAM.

28. A method for communicating over a communications channel and with reduced undesired local echo, the method comprising the steps of:
　generating a transmit signal to the communications channel in a frequency band outside a voice frequency band;
　generating a scaled replica of the transmit signal based upon a scale control signal;
　receiving signals from the communications channel with in or outside the voice frequency band and being susceptible to undesired local echo from the transmit signal, and while reducing the undesired local echo by subtracting the scaled replica of the transmit signal from the received signals; and
　sensing received signal power and generating the scale control signal based upon the received signal power while also encoding a digital signal from the received signals and controlling a resistor ladder responsive thereto to thereby reduce the undesired local echo.

29. A method according to claim 28 wherein the step of reducing echo comprises the step of testing the communications channel by inputting a predetermined test signal for transmission when the received signal power is being sensed.

30. A method according to claim 29 wherein the step of reducing echo comprises the step of setting the scale control signal responsive to sensing a minimum received signal power during testing of the communications channel.

31. A method for communicating over a communications channel with reduced undesired local echo, the method comprising the steps of:
　generating a transmit signal to the communications channel in a frequency band outside a voice frequency band;
　generating a scaled replica of the transmit signal amplitude and phase synchronized therewith, the generating step comprising characterizing the communications channel; and
　receiving signals from the communications channel within or outside the voice frequency band and being susceptible to undesired local echo from the transmit signal, and while reducing the undesired local echo by subtraction of the scaled and phase synchronized replica of the transmit signal, while also generating a clock speed in a transmit digital-to-analog converter at the same or a different clock rate than a cancellor digital-to-analog converter with the same or a different resolution.

32. A method according to claim 31 wherein the step of generating the scaled replica comprises generating same using a processor and creating a model of the undesired local echo path therewith.

33. A method according to claim 32 wherein the step of channel characterization comprises generating a test signal.

34. A method according to claim 33 wherein the step of generating the replica signal comprises storing a plurality of models relating to respective different characterizations of the communications channel.

* * * * *